United States Patent
Whitehouse et al.

(10) Patent No.: US 10,773,796 B2
(45) Date of Patent: Sep. 15, 2020

(54) WING-TIP ARRANGEMENT HAVING VORTILONS ATTACHED TO A LOWER SURFACE, AND AIRCRAFT HAVING SUCH A WING-TIP ARRANGEMENT AND THE USE OF VORTILONS ON A WING-TIP ARRANGEMENT

(71) Applicants: Airbus Operations GmbH, Hamburg (DE); Airbus Operations Ltd., Bristol (GB)

(72) Inventors: Ian Roy Whitehouse, Hamburg (DE); Thomas Ehlers, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 410 days.

(21) Appl. No.: 15/677,434

(22) Filed: Aug. 15, 2017

(65) Prior Publication Data
US 2018/0050790 A1 Feb. 22, 2018

(30) Foreign Application Priority Data
Aug. 16, 2016 (EP) .................................... 16184408

(51) Int. Cl.
*B64C 23/06* (2006.01)
(52) U.S. Cl.
CPC .......... *B64C 23/069* (2017.05); *B64C 23/065* (2013.01); *Y02T 50/164* (2013.01)

(58) Field of Classification Search
CPC ...................................................... B64C 23/06
See application file for complete search history.

(56) References Cited

U.S. PATENT DOCUMENTS

| 8,727,285 | B2 | 5/2014 | Theurich et al. | |
|---|---|---|---|---|
| 2009/0120205 | A1* | 5/2009 | Clingman | B64C 23/06 73/861.22 |
| 2013/0037657 | A1* | 2/2013 | Breidenthal | F03D 1/0633 244/204.1 |
| 2015/0041597 | A1* | 2/2015 | Theurich | B64C 23/065 244/199.4 |
| 2016/0152324 | A1* | 6/2016 | Graff | B64C 21/10 137/561 R |

* cited by examiner

*Primary Examiner* — Nicholas McFall
*Assistant Examiner* — Terri L Filosi
(74) *Attorney, Agent, or Firm* — Nixon & Vanderhye P.C.

(57) ABSTRACT

A wing-lip arrangement couplable with a wing of an aircraft includes a connection region for coupling or integration with the wing end region, at least one tip, at least one upper surface and at least one lower surface, which extend between a leading edge and a trailing edge of the wing-tip arrangement from the connection region to the at least one tip, and at least one vortilon. The local dihedral of the wing-tip arrangement changes between the at least one tip and the connection region, such that at least a part of the wing-tip arrangement projects at an angle relative to the wing. The at least one vortilon includes a vortilon base and a vortilon tip. The vortilon base is attached to at least one of the at least one lower surface of the wing-tip arrangement. The vortilon tip faces in an upstream direction.

12 Claims, 5 Drawing Sheets

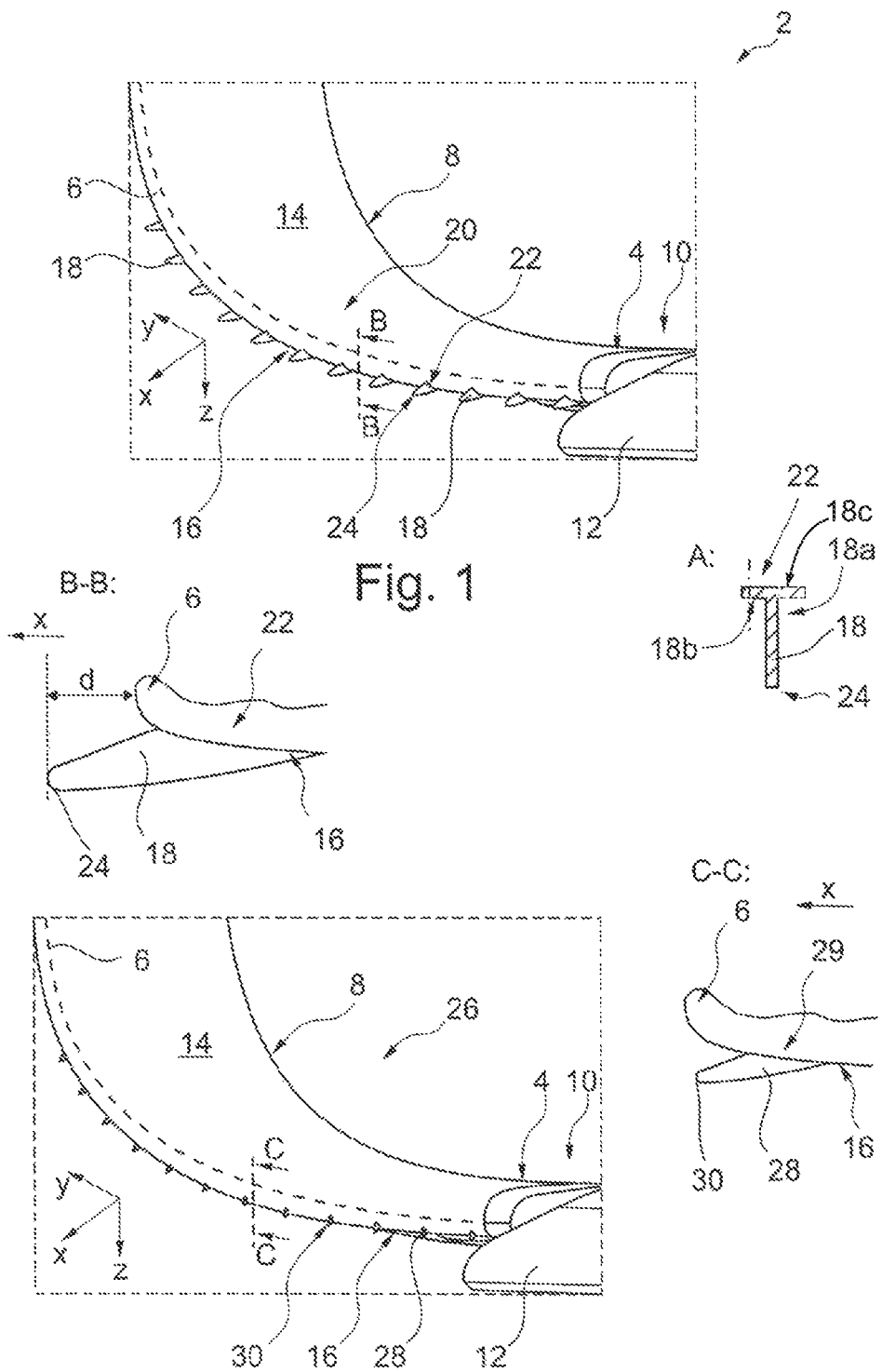

WING-TIP ARRANGEMENT HAVING VORTILONS ATTACHED TO A LOWER SURFACE, AND AIRCRAFT HAVING SUCH A WING-TIP ARRANGEMENT AND THE USE OF VORTILONS ON A WING-TIP ARRANGEMENT

CROSS-REFERENCE TO PRIORITY APPLICATION

This application claims the benefit of, and priority to, European patent application number 16184408.9, filed Aug. 16, 2016.

TECHNICAL FIELD

Embodiments of the invention relate to a wing-tip arrangement at a wing of an aircraft as well as an aircraft having a wing and two wing-tip arrangements at the wing. Embodiments of the invention further relate to the use of vortilons attached to a lower surface of a winglet for enhancing the winglet related performance benefit in low-speed and high angle of incidence conditions.

BACKGROUND

It is known to install passive flow control devices on an aircraft at various different positions of a fuselage, wings, engine cowls or other components subjected to an air flow in order to enhance the low speed stall characteristics, e.g., in high lift conditions, while minimizing any cruise penalty, e.g., additional drag during cruise of the aircraft. For example, so-called vortilons arranged on a lower leading edge of a wing, which vortilons can have some of the characteristics of a fence or a vortex generator, are known. They are often associated with aircraft configurations with rear fuselage mounted engines and T-tails. They may vary in size from engine pylon type scales to boundary layer vortex generator scales. However, many shapes and sizes are known.

Further, it is known to use so-called winglets or other wing-tip devices to improve the efficiency of fixed-wing aircraft by reducing lift-induced drag. Resultantly, the use of wing-tip devices may improve the lift-to-drag ratio, which will increase the fuel efficiency.

For example, U.S. Pat. No. 8,727,285 shows a wing for an aircraft having a wing tip shape with a substantially planar winglet and a transition region arranged between the wing and the winglet, that extends from a connection on the wing to a connection on the winglet and has a curvature of the local dihedral that increases in the outboard direction.

BRIEF SUMMARY

Airflow on a winglet may experience a partial separation in one of several different ways depending on the specific design of the wing and wing-tip device combination, the aerodynamic load acting upon it and the flight conditions including yaw. It is an object of the disclosed embodiment(s) to enhance the low-speed airflow characteristics of a wing having wing-tip devices and, in particular, for high angles of incidence.

Certain objectives are met by a wing-tip arrangement at a wing according to claim 1. Advantageous embodiments and further improvements may be gathered from the sub-claims and the following description.

A wing-tip arrangement for a wing of an aircraft is proposed, the wing-tip arrangement comprising a wing end region, a connection region for coupling or integration with the wing end region, at least one tip, at least one upper surface and at least one lower surface, which extend between a leading edge and a trailing edge of the wing-tip arrangement from the connection region to the at least one tip; and at least one vortilon. The local dihedral of the wing-tip arrangement changes between the at least one tip and the connection region, such that at least a part of the wing-tip arrangement projects at an angle relative to the wing, when coupled with the wing. At least one vortilon comprises a vortilon base and a vortilon tip, wherein the vortilon base is attached to at least one of the at least one lower surface of the wing-tip arrangement. The vortilon tip faces in a generally upstream direction.

The aircraft, which is to be equipped with the aforementioned wing-tip arrangement, may be realized as a commercial aircraft, a business aircraft, a leisure and sports aircraft or a transport aircraft, which may comprise a central, longitudinal fuselage and a main wing attached thereto or which may be designed as a blended wing body. The wing-tip arrangement according to the invention is particularly useful for aircraft with turbofan or turboprop engines that may lead to flight speeds up to a transonic range.

For improving the aerodynamic characteristics of the aircraft, the wing is equipped with such a wing-tip arrangement, which may be connected to a wing end through a dedicated pair of connecting means. Alternatively, the wing-tip arrangement may be realized in an integrated manner, i.e., as an integral part of the wing.

The connection region may be directed to a spanwise position of the wing-tip arrangement, which comprises a structural connection element for connecting to the wing end region. The connection may be realized by an end surface, a flange, a frame or other connection elements, which may be joined with a matching end surface, a flange, a frame or other connection elements on the wing. This may be the case with attaching retrofit wing-tip devices for achieving such a wing-tip arrangement, where the connection region is precisely determinable.

Alternatively, the connection region may be understood as a region in which the wing-tip arrangement makes a transition into the wing. Instead of relating to a strict spanwise location the connection region in this case may cover a certain range of a spanwise direction. For example, the connection region may extend just up to an outboard end of an outermost high lift device. With a continuous transition between a wing and a wing tip a wing end may be considered at an inboard end of the transition region, where, e.g., a curvature of the transition region starts to deviate. This may be the case with wing-tip arrangements, which constitute an integral part of the wing.

The same applies for the wing end region. The wing end region may be directed to a spanwise position of the wing, which comprises a structural connection element for connecting to a separate wing tip device. The connection may be realized by an end surface, a flange, a frame or other connection elements, which may be joined with a matching end surface, a flange, a frame or other connection elements of the wing tip device. This may be suitable for receiving retrofit wing tip devices for achieving such a wing-tip arrangement.

In the same way the wing end region may be understood as a region in which the wing makes a transition into the wing-tip arrangement. Instead of relating to a strict spanwise location the wing end region in this case may cover a certain range of a spanwise direction. For example, the wing end region may extend just outboard of an outboard end of an outermost high lift device, which is attached to the wing. With a continuous transition between a wing and a wing tip an accurate spanwise position of a wing end cannot be determined. This interpretation should be considered with wing-tip arrangements, which constitute an integral part of the wing.

Consequently, the wing-tip arrangement may be interpreted as including a wing-tip device and a wing end region, be it a retrofittable or a fully integrated wing-tip device.

The design and dimensions of the wing-tip arrangement depends on the intended service of the aircraft and may include a variety of different types. The design may further depend on whether it is installed in a new aircraft or as a retrofit solution. For example, aircraft for mid and long range service may comprise a wing-tip arrangement with a relatively large wing-tip device, which is strongly swept in an upward direction and which comprises a relatively large continuously curved transition section between a wing end region and a planar winglet that extends at an angle to the wing. The wing-tip arrangement may also include types that vary in shape continuously, winglets with a distinct junction, a winglet projecting in an upward direction or a downward direction as well as a split winglet and any other type in-between. To render some of these types clearer it is referred to FIGS. 9 and 10.

Overall, the wing-tip arrangement comprises at least one upper surface and at least one lower surface, which define the three-dimensional shape of the wing-tip arrangement between the wing end region and the at least one tip. The upper and lower surfaces may comprise a certain curvature about a spanwise direction between the leading edge and the trailing edge, which influences the aerodynamic characteristics, e.g., the lift and drag, of the wing-tip arrangement.

Certain embodiments of the invention provide at least one vortilon on the lower surface of the wing-tip arrangement, such that the at least one vortilon protrudes from the lower surface at an angle and such that the vortilon tip faces in a generally upstream direction. The function of the at least one vortilon is to interact with an airflow that impinges on the wing-tip device in such a way that vortices are generated. The at least one vortilon may be arranged on any position on the at least one lower surface, which is suitable for achieving the desired effect. It may include the wing end region and the connection region and any position further outboard.

Vortices, which are generated by the at least one vortilon, may be exploited to beneficially interfere with a boundary layer on the wing-tip arrangement in such a way that higher momentum airflow closer to free stream conditions is transported down towards the respective aerodynamic surfaces and is exchanged for lower momentum airflow. Such a mixing effect results in a boundary layer, which is more resistant to a reversal under the action of an adverse pressure gradient over the considered region of the wing-tip arrangement.

When the aerodynamic surfaces of the wing-tip arrangement are intended to create lift the vortices may be used to delay the initiation of flow separation from adjacent areas of the surface, thus preserving lift and delaying an increase in drag.

A flow separation on the wing-tip arrangement and a subsequent reduction of lift and increase of drag is complex owing to the extreme three-dimensional nature of flow at the extremity of wings, which may further be exaggerated by deployed high lift devices and/or deflected control surfaces. Vortilons fixed to a leading edge region of a wing-tip arrangement anywhere from the adjacent wing and the connection region and out to the tip may generate vortices to assist in delaying and controlling a flow separation. The design, size, position, orientation and disposition however needs to be tailored according to an understanding of the global and local flow conditions at a range of flight conditions. This depends on the overall design of the wing-tip arrangement, the wing, the high lift devices attached to the wing as well as other parameters crucial for the aircraft operation.

Airflow approaching the leading edge of the wing-tip arrangement will divide above and below the upper surface of the wing-tip arrangement defining an attachment line. A notional surface divides the flow, which passes on either side of the wing-tip arrangement and intersects the leading edge at this line. If any portion of the vortilon is above that notional surface or line, any disturbance it creates will pass over the top of the wing-tip arrangement.

The vortilons may be so designed and positioned such that for cruise conditions, any disturbance passes over the lower surface of the wing-tip arrangement causing a minimum drag penalty. However, for low speed and high incidence conditions approaching stall a disturbance in the form of a vortex or multiple vortices pass over the upper surface of the wing-tip arrangement, such that a flow separation is inhibited.

If the cause of a potential lift reducing and drag increasing flow separation is precipitated by flow features initiated at the tip of the wing-tip arrangement and the origin moves inboard as the flight condition changes, at least one vortex generated by the at least one vortilon may be used to interfere with and delay its progress. If the lift reducing and drag increasing flow feature has its origin at the end of a high lift device adjacent to the wing-tip arrangement, i.e. near the connection region, then again the at least one vortilon may be placed adjacent to the connection region, such that at this position the at least one generated vortex may delay its influence on the main portion of the wing-tip arrangement.

If a governing flow separation originates over the mid portions of the wing-tip arrangement from either the leading edge or trailing edge rather than at the tip or the connection region or adjacent to a high lift device, then at least one vortilon may delay that separation by increasing the robustness of the boundary layer.

In an advantageous embodiment, the wing-tip arrangement comprises a plurality of vortilons, which are arranged at a distance to each other on the respective lower surface of the wing-tip arrangement. Thereby, a wider field of the boundary flow in a spanwise extension can be influenced depending on the actual design of the wing-tip arrangement and wing combination. Given that there may be flight conditions where none of the above mentioned conditions for a flow separation dominate or where the dominating feature differs from that at another flight condition a combination of vortilon designs and positions may prove the most beneficial.

For this reason, an effective solution may also involve a combination of vortilons and other flow control devices, e.g., vortex generators.

It may be beneficial if all vortilons have the same shape. In this context, the expression "same shape" does not necessarily mean that the vortilons have the same size. They may as well have different sizes, but their outer contours match either directly or by application of a certain scaling.

Consequently, it may also be beneficial that the vortilons have the same size. In a plurality of vortilons arranged on the lower surface of the wing-tip arrangement, all vortilons may have the same size, which reduces the number of different parts required for manufacturing the wing-tip arrangement. Further, this may also simplify the maintenance. However, providing vortilons with the exact same size depends on the applicability of a plurality of vortilons depending on the actual design of the wing-tip arrangement and the expected conditions in low-speed flight.

It is not necessary for the vortilons to have the same shape and same size. Both may be altered in a group of vortilons depending on the desired effect, which in turn may depend on individual spanwise positions due to local flow characteristics.

In the same way, the plurality of vortilons may be arranged in an equidistant manner on the respective lower surface. Depending on the local flow field and the desired effect, the individual vortilons may also comprise a varying space to each other. A combination of pairs or groups of vortilons with the same distances to each other and vortilons with other distances may also be beneficial.

It is preferred that the at least one vortilon extends perpendicularly to the respective lower surface.

It may be beneficial if the vortilon tip of at least one of the at least one vortilons extends forward of the leading edge of the wing-tip arrangement or the adjacent wing in a generally upstream direction such that it interferes with the flow field in certain ranges of incidence.

It may also be beneficial if the vortilon tip of at least one of the at least one vortilon does not extend forward of the leading edge of the wing-tip arrangement or the adjacent wing in a generally upstream direction. This may be beneficial for an at least partially drooped leading edge.

In a group of vortilons arranged at the lower surface, all, none or a part of the vortilons may comprise a vortilon tip that extends forward of the leading edge in a generally upstream direction.

The wing-tip arrangement may comprise an essentially planar winglet having the tip and a transition region having the connection region. The winglet extends at an angle to the wing. The transition region is curved and connects the winglet and the wing end region in a tangentially continuous manner to form the wing-tip arrangement. Such a wing-tip arrangement may be particularly efficient. The transition region may comprise a certain course of curvature, which may be constant or which may increase or decrease in an outboard direction. This provides a means to positively influence the interference drag between the wing and the wing-tip arrangement.

It may be beneficial that the at least one vortilon is exclusively placed in such a transition region. The transition region may be subject to flow conditions, which can be improved particularly for low-speed and high incidence situations.

With a decreasing chord in a spanwise direction, the dimensional extension of the vortilons along the upstream direction may decrease with further outboard positions.

It may also be beneficial to scale the dimensional extension of the vortilons along the upstream direction corresponding to the local chord of the wing-tip arrangement. The scale of the vortilons affect the size, character and path of the generated vortices. The scale of the vortices relative to the flow field, the boundary layer, and the aerodynamic surfaces of the wing-tip arrangement is influential as the aerodynamic effect may in detail be different. Taking the example of a vortex generated upstream of a wing-tip arrangement the vortex may be so positioned, and be of such a relative scale, that it interferes with the flow-field to create an up-wash on one part of the wing-tip arrangement and a downwash at an adjacent position. The effect is different in scale from vortices of boundary layer type dimensions but both may be exploited in managing the stall characteristics of an aerodynamic surface.

The at least one vortilon may comprise an L-shaped or T-shaped cross-sectional profile perpendicular to the upstream direction, wherein the vortilon base is associated with a leg or legs of respectively the L-shaped or T-shaped cross-sectional profile. In the case of the L-shaped profile the vortilon base may be positioned further outboard than the vortilon tip. This simplifies the installation of such a vortilon, as a leg of the vortilon base may be riveted, glued or otherwise fastened to the lower surface of the wing-tip arrangement. Providing the vortilon base in a further outboard direction reduces the influence of the vortilon base on the flow field on the wing-tip arrangement, if it is not completely flush with the lower surface or respective recesses arranged therein.

An embodiment of the invention further relates to an aircraft, comprising a wing having two wing-tip arrangements according to the above description.

Still further, the wing-tip arrangement may also comprise at least one of a vortex generator and a fence attached to the upper surface. The attachment position may be placed in a region somewhere between the attachment line and say the 75% chordwise dimension on the top surface. This may include a single vortex generator as well as a plurality of vortex generators, a single fence or a plurality of fences and any combination thereof.

Still further, an embodiment of the invention is directed to the use of vortilons at a lower surface of a wing-tip arrangement to improve low-speed stall characteristics on the wing-tip arrangement.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the embodiments of the present invention result from the following description of the exemplary embodiments illustrated in the figures. Furthermore, identical or similar objects are identified by the same reference symbols in the figures.

FIGS. 1 to 4 show different wing-tip arrangements equipped with vortilons.

DETAILED DESCRIPTION

Figure 3:
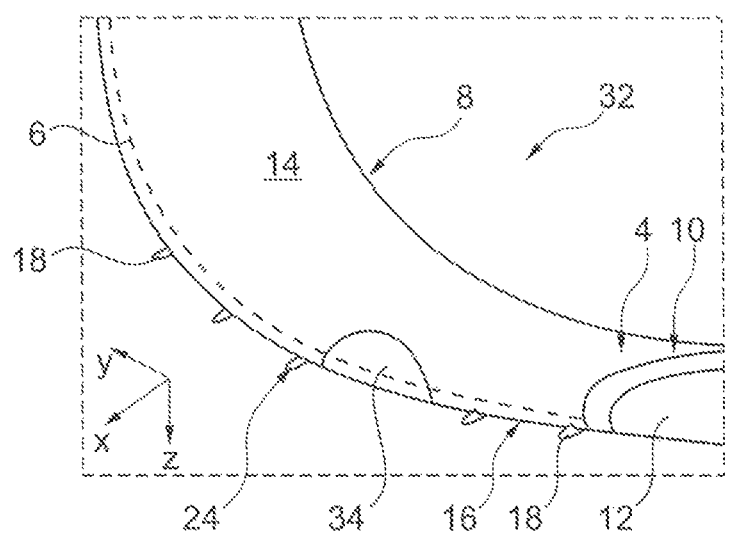

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

FIG. 1 shows a first exemplary embodiment of a wing-tip arrangement 2 with a connection region 4 and a tip 42 (not shown), a leading edge 6 as well as trailing edge 8. The wing-tip device 2 is attachable to a wing 38, which is schematically illustrated having an extended slat 12. Here, the wing-tip arrangement comprises a wing end region 10 and a connection region. The outer part of the wing-tip arrangement 2 from the connection region 11 further outboard may exemplarily be considered a wing-tip device, which is attached to a wing end. However, the wing-tip arrangement 2 may also be fully integrated into the wing 38 and does not comprise a dedicated structural wing end. The wing-tip arrangement 2 basically includes an outer part of the wing 38 with the wing end region 10, basically from an outermost position of the high-lift device 12 further outboard.

The wing-tip arrangement 2 comprises an upper surface 14 as well as a lower surface 16, wherein the upper surface 14 and the lower surface 16 extend from the leading edge 6 to the trailing edge 8. Both surfaces define the overall shape of the wing-tip arrangement.

At the lower surface 16, a plurality of vortilons 18 are arranged at a distance from each other and distributed in a leading edge region 20. The vortilons 18 each comprise a vortilon base 22, which is connected to the lower surface 16. The vortilons 18 further comprise a vortilon tip 24, which generally protrudes in a generally upstream direction. Exemplarily, the vortilons 18 are flat or curved members with a rounded vortilon tip 24. The vortilons 18 are attached to the lower surface 16 such that they are arranged perpendicular to their attachment position on the lower surface 16. The thickness of the vortilons 18 as well as their curvature depends on the desired effect as well as the overall aerodynamic characteristics.

Exemplarily, the vortilon tips 24 extend forward of the leading edge 6 in an upstream direction. This is illustrated in a partial sectional view indicated with B-B. Here, a distance "d" is indicated between the leading edge 6 and the vortilon tip 24, which extends along the principal (aircraft fixed) longitudinal axis x according to common aircraft norms.

A portion of the approaching airflow is intercepted by the vortilons creating vortices. At certain flight conditions the path of the vortices means that they act on the boundary layer on the upper surface 14 to prevent a local flow separation particularly at large angles of incidence. Several vortilons 18 are arranged at the lower surface 16 in order to achieve the boundary layer control over a certain area of the wing-tip arrangement 2.

The sizing and spacing of the vortilons 18 will influence the flow characteristics. It is feasible to conduct certain flight tests for finding the right balance between the size, shape, position and orientation of the vortilons as well as the inter-spacing needed to yield the vortex field required to provide the expected benefits at low speed whilst minimizing any cruise drag penalties. Such flights can be supported by judicious use of CFD and wind tunnel testing. A system of vortices merging together may have a counterproductive effect and not treat a separated flow. Hence, larger more closely placed vortilons 18 may not necessarily provide better effects and may even be counterproductive. Hence, in the following figures, other exemplary embodiments are shown, which may also be useful for improving the flow separation behavior at the wing-tip arrangement 2.

In a detail view "A" the vortilon 18 is shown having an L-shaped cross-sectional profile when viewed parallel to the main extension of the vortilon. The cross-sectional profile comprises two legs 18a and 18b, wherein leg 18b may be considered the vortilon base 22, which is attachable to the lower surface 16. The leg 18a may be considered a vortilon blade, which protrudes from the lower surface 16. The vortilon 18 may have a T-shaped cross-sectional profile as shown by a base that includes both 18b and 18c, and leg 18a, wherein leg 18c, is shown in dotted lines to indicate that it is not in the L-shaped cross-sectional profile.

In FIG. 2, a wing-tip arrangement 26 is shown with a plurality of vortilons 28, which are of a smaller scale than the vortilons 18 of FIG. 1. However, the same distribution, i.e. the same spanwise distances, are chosen.

Still further, the vortilons 28 comprise a vortilon base 29 and a vortilon tip 30, which does not extend over the leading edge 6 in an upstream direction. However, when experiencing a certain angle of incidence, the vortices will influence the boundary layer on the upper surface 14 of the wing-tip arrangement 26.

FIG. 3 shows a wing-tip arrangement 32, which comprises a navigation light 34 in a curved section. A reduced number of vortilons 18, which are chosen to be equal to the vortilons 18 in FIG. 1, are distributed at a lower surface 16 of the wing-tip arrangement 32. A region comprising the navigation light 34 does not contain any vortilon 18.

Figure 4:
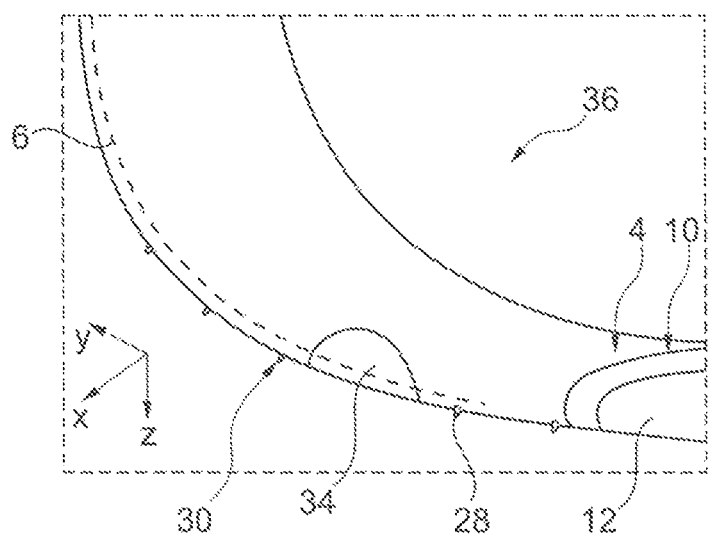

FIG. 4 is a counterpart of FIG. 2 and shows a wing-tip arrangement 36, which has a navigation light 34 as well as a number of vortilons 28 equal to those shown in FIG. 2. The vortilons 28 are reduced in number and comprise larger distances to each other compared to FIG. 2. Again, a region containing the navigation light 34 does not comprise any vortilons 28.

Figure 5:
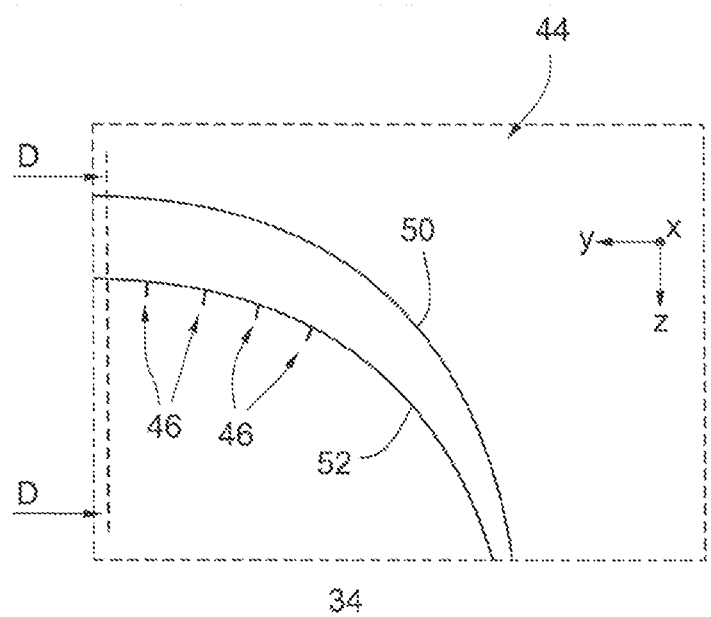
FIGS. 5 and 6 show a wing-tip arrangement extending downwardly.
Figure 6:
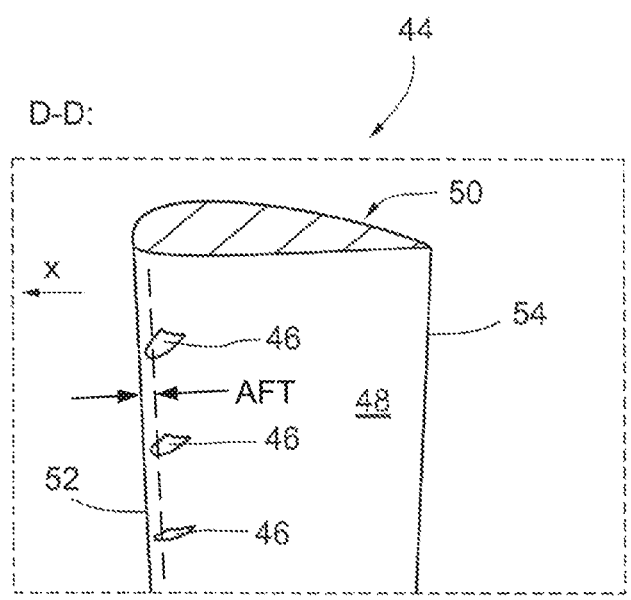

FIGS. 5 and 6 show a part of a wing-tip arrangement 44 in a front view (FIG. 5) and a partially sectional view (FIG. 6). Here, the wing-tip arrangement 44 comprises a lower surface 48, an upper surface 50, a leading edge 52 and a trailing edge 54. The wing-tip arrangement 44 projects downwardly instead of upwardly as in the previous figures. Several vortilons 46, which are merely schematically illustrated, are arranged on the lower surface 48. Exemplarily, each of the vortilons 46 extends perpendicular to the lower surface 48. A tip of at least one of the vortilons is aft of the leading edge 52, as indicated by the gap labeled AFT in FIG. 6.

Figure 7A:
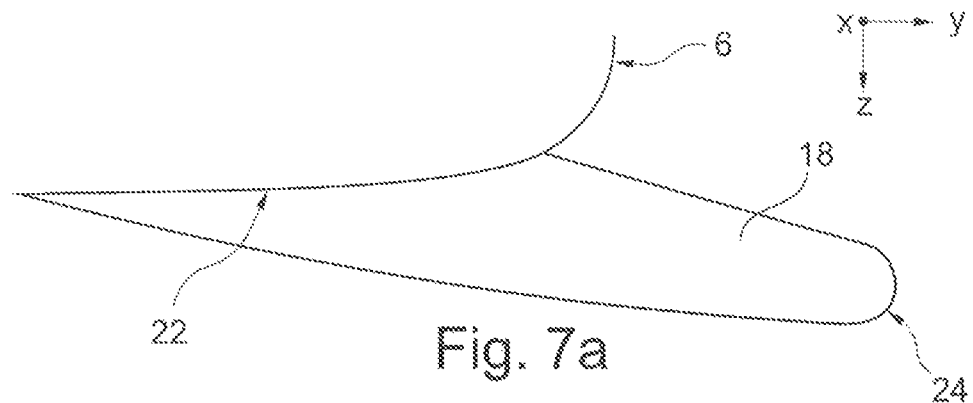
FIGS. 7a to 7b show an exemplary embodiment of a vortilon in two different sizes.
Figure 7B:
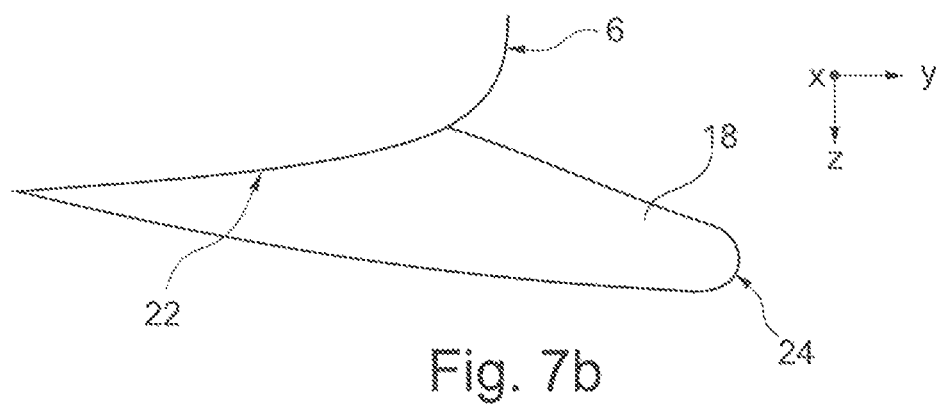

FIGS. 7a and 7b exemplarily show a vortilon 18 in a side view showing the overall shape from a base 22 to the vortilon tip 24. The vortilons shown in FIGS. 7a and 7b comprise the same shape but different scales. It may be feasible to let the vortilons 18 decrease in size with a further outboard instalment position, such that for example FIG. 7b shows an outermost vortilon 18, while FIG. 7a shows an innermost vortilon 18.

Figure 8:
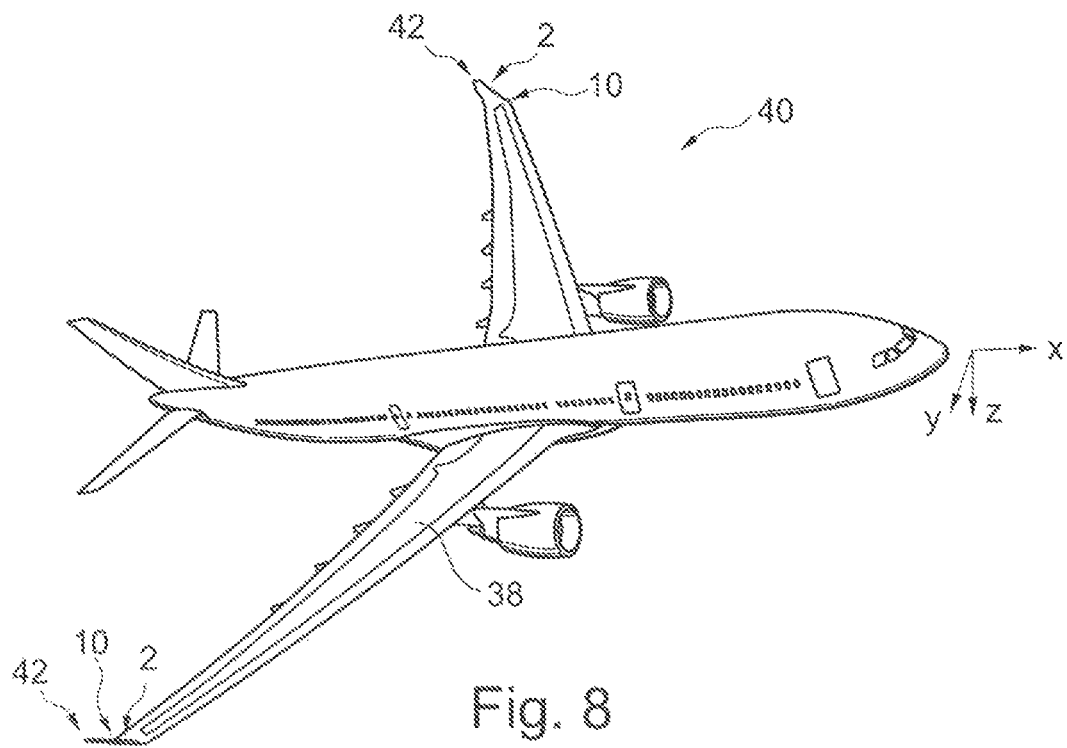
FIG. 8 shows an aircraft equipped with wing-tip arrangements having vortilons.

FIG. 8 shows an aircraft 40 having a wing 38 with wing end regions 10, to which wing-tip arrangements 2 are attached.

Figure 9:
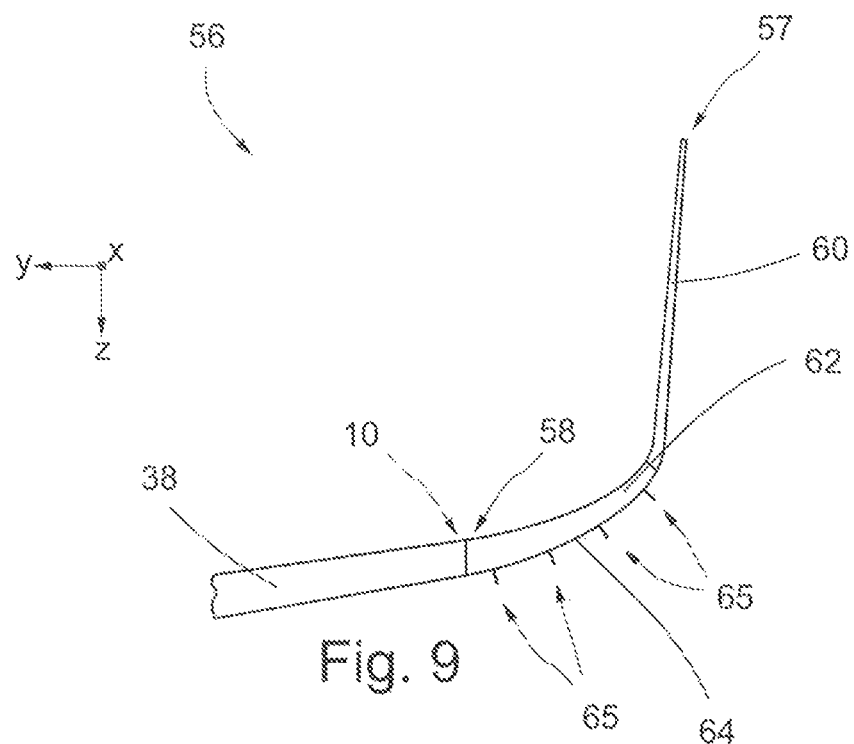
FIGS. 9 and 10 show still further exemplary embodiments of a wing-tip arrangement.

FIG. 9 shows a wing-tip arrangement 56 based on a type, which is attached to a wing end region 10. Just as an example it is shown to connect to a precise spanwise position. However, this is just an example and does not exclude the wing-tip arrangement 56 being fully integrated into the wing 38. The wing-tip arrangement 56 therefore just exemplarily comprises a connection region 58 at a precise spanwise position. In case the wing-tip arrangement 56 is chosen to be fully integrated into the wing, wing end region 10 and the connection region 48 may be considered as a range of spanwise positions, as demonstrated in FIG. 10.

The wing-tip arrangement 56 comprises a planar winglet 60. At the end of the planar winglet, which extends at an angle to the wing 38, a tip 57 is provided. A transition region 62 provided between the winglet 60 and the wing 38 completes the wing-tip arrangement 56 in a tangentially continuous manner with a curvature that increases in an outboard direction. Vortilons 65 may be attached to a lower surface 64 of the wing-tip arrangement 56.

Figure 10:
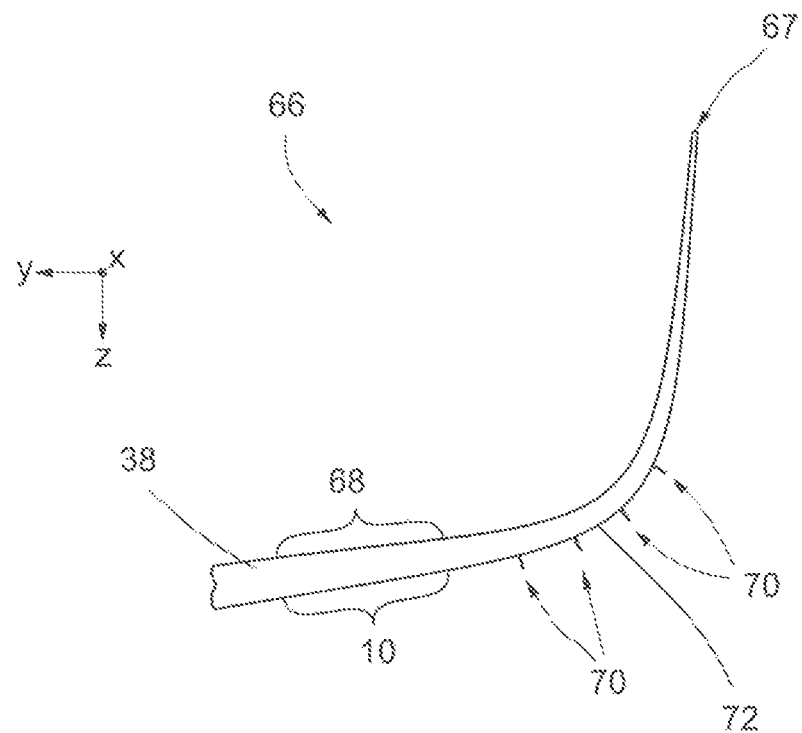

FIG. 10 shows a wing-tip arrangement 66, where instead of a planar winglet 60 a continuously curved shape is chosen, which ends with a tip 67. Exemplarily, the wing-tip arrangement 66 is fully integrated into the wing 38, such that the wing end region 10 as well as a connection region 68 include a range of spanwise positions. At a lower surface 72 a plurality of vortilons 70 is arranged.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of tiling this patent application.

What is claimed is:

1. A wing-tip arrangement for a wing of an aircraft, the wing-tip arrangement comprising:
    a wing end region;
    a connection region for coupling or integration with the wing end region;
    at least one tip;
    at least one upper surface and at least one lower surface, which extend between a leading edge and a trailing edge of the wing-tip arrangement from the connection region to the at least one tip; and
    a plurality of vortilons arranges at a distance to each other on the respective lower surface of the wing-tip arrangement, and;
    wherein a local dihedral of the wing-tip arrangement changes between the at least one tip and the connection region, such that at least a part of the wing-tip arrangement projects at an angle relative to the wing, when coupled with the wing;
    wherein each vortilon of the plurality of vortilons comprises a vortilon base, and a vortilon tip;
    wherein the vortilon base is attached to at least one of the at least one lower surface of the wing-tip arrangement and wherein the vortilon tip faces in a generally an upstream direction; and
    wherein a dimensional extension of the vortilons along the upstream direction decreases with further outboard positions.

2. The wing-tip arrangement according to claim 1, wherein all of the plurality of vortilons have the same shape.

3. The wing-tip arrangement according to claim 2, wherein the plurality of vortilons have the same size.

4. The wing-tip arrangement according to claim 1, wherein the plurality of vortilons are arranged in an equidistant manner on the respective lower surface.

5. The wing-tip arrangement according to claim 1, wherein the dimensional extension of the vortilons along the upstream direction is scaled corresponding to a local chord of the wing-tip arrangement.

6. The wing-tip arrangement according to claim 1, wherein the at least one of the plurality of vortilons extends perpendicularly to the respective lower surface.

7. The wing-tip arrangement according to claim 1, wherein the vortilon tip of at least one of the plurality of vortilons extends forward of the leading edge of the wing-tip arrangement or the wing in an upstream direction.

8. The wing-tip arrangement according to claim 1, wherein the vortilon tip of at least one of the plurality of vortilons does not extend forward of the leading edge of the wing-tip arrangement or the adjacent wing in an upstream direction.

9. The wing-tip arrangement according to claim 1, wherein:
    the wing-tip arrangement comprises an essentially planar winglet having the tip, and a transition region having the connection region;
    the planar winglet extends at an angle to the wing; and
    the transition region is curved and connects the planar winglet and the wing end region in a tangentially continuous manner to form the wing-tip arrangement.

10. The wing-tip arrangement according to claim 9, wherein all of the plurality of vortilons are exclusively placed on the transition region.

11. The wing-tip arrangement according to claim 1, wherein:
    the at least one of the plurality of vortilons has an L-shaped or T-shaped cross-sectional profile perpendicular to the upstream direction;
    the vortilon base is associated with at least one leg of the L-shaped or T-shaped cross-sectional profile; and the vortilon base is positioned further outboard than the vortilon tip.

12. An aircraft comprising a wing having two wing end regions, each of the wing end regions coupled with a wing-tip arrangement, the wing-tip arrangement comprising:
    a wing end region;
    a connection region for coupling or integration with the wing end region;
    at least one tip;
    at least one upper surface and at least one lower surface, which extend between a leading edge and a trailing edge of the wing-tip arrangement from the connection region to the at least one tip; and
    a plurality of vortilons arranges at a distance to each other on the respective lower surface of the wing-tip arrangement, and;
    wherein a local dihedral of the wing-tip arrangement changes between the at least one tip and the connection region, such that at least a part of the wing-tip arrangement projects at an angle relative to the wing, when coupled with the wing;

wherein each vortilon of the plurality of vortilons comprises a vortilon base and a vortilon tip;
wherein the vortilon base is attached to at least one of the at least one lower surface of the wing-tip arrangement;
wherein the vortilon tip faces in a generally an upstream direction, and
wherein a dimensional extension of the vortilons along the upstream direction decreases with further outboard positions.

* * * * *